(12) United States Patent
Sugiura et al.

(10) Patent No.: US 7,669,568 B2
(45) Date of Patent: Mar. 2, 2010

(54) VALVE TIMING CONTROLLER

(75) Inventors: Taei Sugiura, Anjo (JP); Yasushi Morii, Nagoya (JP)

(73) Assignee: Denso Corporation, Kariya (JP)

( * ) Notice: Subject to any disclaimer, the term of this patent is extended or adjusted under 35 U.S.C. 154(b) by 365 days.

(21) Appl. No.: 11/905,847

(22) Filed: Oct. 4, 2007

(65) Prior Publication Data

US 2008/0083387 A1 Apr. 10, 2008

(30) Foreign Application Priority Data

Oct. 6, 2006 (JP) .............................. 2006-275515

(51) Int. Cl.
*F01L 1/34* (2006.01)
(52) U.S. Cl. .................. 123/90.17; 123/90.15; 464/160
(58) Field of Classification Search .............. 123/90.15, 123/90.16, 90.17, 90.18, 90.27, 90.31; 464/1, 464/2, 160
See application file for complete search history.

(56) References Cited

U.S. PATENT DOCUMENTS 6,532,921 B2 * 3/2003 Sato et al. ................ 123/90.17

FOREIGN PATENT DOCUMENTS

JP 2005-264898 9/2005

\* cited by examiner

*Primary Examiner*—Ching Chang
(74) *Attorney, Agent, or Firm*—Nixon & Vanderhye, PC

(57) ABSTRACT

A valve timing controller has a shaft body as an output rotor, a torque generating system which generates the controlling torque outputted from the shaft body, and a planet carrier as an input rotor connected with the shaft body. A phase adjusting mechanism adjusts the relative rotational phase between a crankshaft and a camshaft according to the control torque inputted into the planet carrier from the shaft body. A bearing rotatably supports the planet carrier. The planet carrier forms a cylindrical input wall press-inserted in an inner circumference of the bearing. The input wall is provided with a fitting recess on its inner surface for engaging with the shaft body, the input wall is provided with a thin-wall portion of which thickness is reduced in a radial direction, and the fitting recess and the thin-wall portion are circumferentially arranged apart from each other.

11 Claims, 11 Drawing Sheets

VALVE TIMING CONTROLLER

CROSS-REFERENCE TO RELATED APPLICATION

This application is based on Japanese Patent Application No. 2006-275515 filed on Oct. 6, 2006, the disclosure of which is incorporated herein by reference.

FIELD OF THE INVENTION

The present invention relates to a valve timing controller which adjusts valve timing of an inlet valve and/or an exhaust valves of an internal combustion engine.

BACKGROUND OF THE INVENTION

A valve timing controller adjusts the relative rotational phase (engine phase) between a crankshaft and a camshaft which determines valve timing by using the controlling torque generated by a torque generation means, such as an electric motor and a dynamo-electric brake.

In such a valve timing controller, an output rotor is connected to an input rotor of a phase adjusting mechanism. The output rotor outputs a control torque, and the phase adjusting mechanism adjusts the engine phase. That is, the engine phase is adjusted according to the control torque which is transferred from the output rotor to the input rotor. For example, in a valve timing controller disclosed in JP-2005-264898A, the input rotor has a cylindrical input wall. A fitting recess is formed at an inner surface of the input wall. A joint member of the output rotor is engaged with the fitting recess, whereby connection strength between these rotors is enhanced.

The input wall of the input rotor is rotatably supported through a bearing member. In order to reduce supporting backlash, it is possible to press-insert the input wall into the inner circumference of the bearing member. However, since the rigidity of the input wall is partially varied in a circumferential direction due to the fitting recess, the input wall is deformed in the circumferential direction when it is inserted. Such a deformation causes a distortion of the fitting recess, so that it will take long time to engage the joint member and the fitting recess. After assembling, the joint member vibrates in the fitting recess, which causes abrasion and noise. In a case that the deformation of the input wall is transferred into the bearing member, a roundness of the bearing member is deteriorated so that life time of the bearing member is reduced.

SUMMARY OF THE INVENTION

It is an object of the present invention to provide a valve timing controller which solves these problems.

According to the present invention, a valve timing controller adjusts valve timing of an inlet valve and/or an exhaust valves which a camshaft opens and closes by the torque transmission from a crankshaft in an internal combustion engine. The controller includes a torque generation means having an output rotor for generating a control torque which is outputted from the output rotor. The controller includes a phase adjusting mechanism including an input rotor connected with the output rotor. The phase adjusting mechanism adjusts a relative rotational phase between a crankshaft and a camshaft of the internal combustion engine according to the control torque which is inputted into the input rotor from the output rotor. A bearing member rotatably supports the input rotor. The input rotor forms a cylindrical input wall press-inserted into an inner circumference of the bearing member. The input wall is provided with a fitting recess on its inner surface for engaging with the output rotor. The input wall is provided with a thin-wall portion of which thickness is reduced in a radial direction. The fitting recess and the thin-wall portion are circumferentially arranged apart from each other.

Thereby, since a rigid variation is reduced in a circumferential direction of an input wall, even if the input wall is press-inserted into the inner circumference of a bearing member to reduce the supporting backlash, a transformation difference is hardly produced in the circumferential direction. As a result, in an input wall, since the configuration distortion of the fitting recess is restrained, the fit assembly at the time of manufacture, the anti-wear quality and silence at the time of actuation can be improved. Moreover, since deterioration of the roundness of the bearing member is restrained even if deformation of the input wall is transferred to the bearing member, the lifetime lowering of the bearing member can be suppressed.

DETAILED DESCRIPTION OF THE PREFERRED EMBODIMENTS

Figure 1:
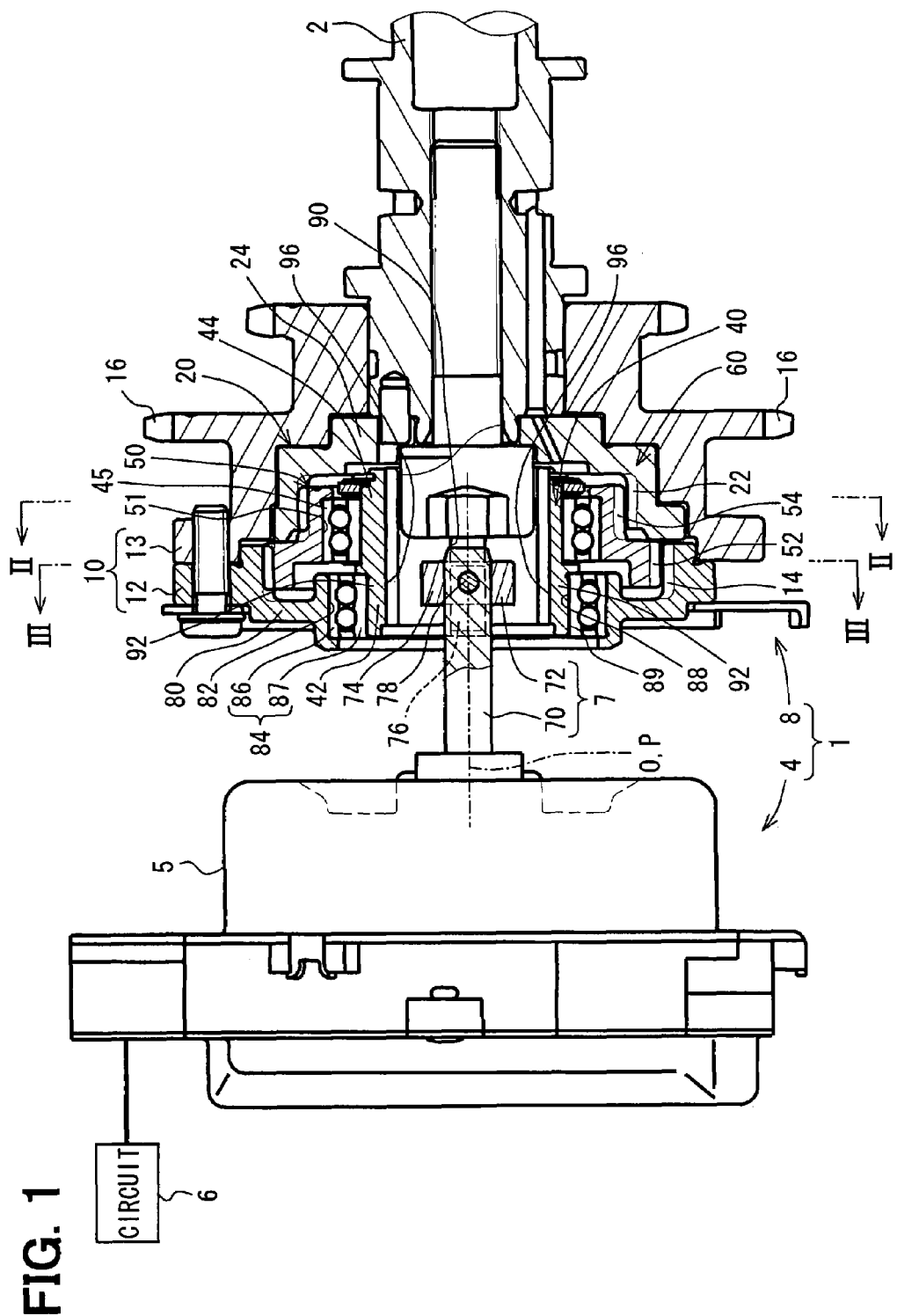
FIG. 1 is a cross sectional view showing a valve timing controller according to a first embodiment of the present invention, taken along a line I-I in FIG. 2.

Hereafter, a plurality of embodiments of the present invention are described. In each embodiment, the same parts and the components are indicated with the same reference numeral and the same description will not be reiterated.

First Embodiment

FIG. 1 shows the valve timing controller 1 according to a first embodiment of the present invention. The valve timing controller 1 is provided in the transmission system which transmits engine torque to the camshaft 2 from the crankshaft (not shown) of the internal combustion engine. The valve timing controller 1 includes a torque generating system 4 and a phase adjusting mechanism 8, and adjusts the engine phase between the crankshaft and the camshaft 2. In the present embodiment, the camshaft 2 opens/closes the intake valve (not shown), and the valve timing controller 1 adjusts the valve timing of the intake valve.

First, the torque generating system 4 is explained. The torque generating system 4 is provided with an electric motor 5 and a control circuit 6.

The electric motor 5 is, for example, a brushless motor, and generates a controlling torque on a shaft 7 when energized. The control circuit 6 includes a microcomputer and a motor driver, and is arranged in exterior and/or interior of the electric motor 5. The control circuit 6 is electrically connected with the electric motor 5 to control the energization of the electric motor 5 according to the operation condition of the internal combustion engine. In response to this controlled energization, the electric motor 5 holds or varies the torque applied to the shaft 7.

Next, the phase adjusting mechanism 8 is explained hereinafter. The phase adjusting mechanism 8 is provided with the driving-side rotor 10, the driven-side rotor 20, the planetary carrier 40, and the planet gear 50.

The driving-side rotor 10 includes a gear member 12 and a sprocket 13 which are coaxially fixed together by a bolt. The peripheral wall part of the gear member 12 forms the driving-side internal gear 14 which has an addendum circle inside of a dedendum circle. The sprocket 13 has a plurality of gear teeth 16. A timing chain (not shown) is wound around the sprocket 13 and a plurality of teeth of the crankshaft so that the sprocket 13 is linked to the crankshaft. Therefore, when the engine torque outputted from the crankshaft is inputted into the sprocket 13 through the timing chain, the driving-side rotor 10 is rotates along with the crankshaft, while maintaining the relative rotational phase relative to the crankshaft. At this time, the driving-side rotor 10 rotates counterclockwise in FIGS. 2 and 3.

Figure 2:
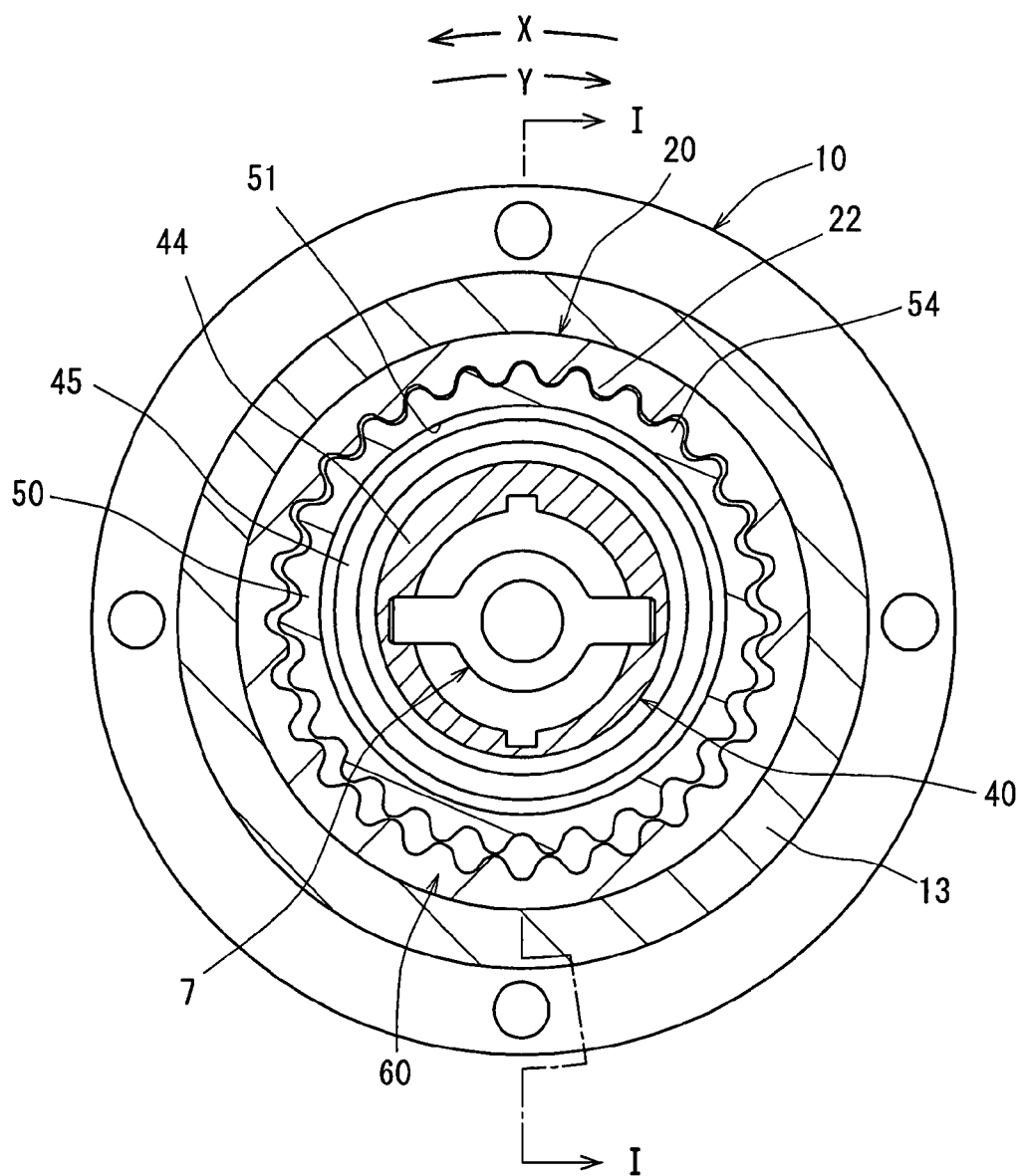
FIG. 2 is a cross sectional view taken along a line II-II in FIG. 1.

As shown in FIGS. 1 and 2, the driven-side rotor 20 is formed in cup shape, and is concentrically arranged in the sprocket 13. The peripheral wall part of the driven-side rotor 20 forms a driven-side internal gear 22 which has an addendum circle inside of its dedendum circle. The driven-side internal gear 22 is located in such a manner as to deviate from a driving-side internal gear 14 in an axial direction.

As shown in FIG. 1, the bottom wall part of the driven-side rotor 20 forms the connecting part 24 which is fixed on the camshaft 2 by a bolt. Since the connecting part 24 is connected with the camshaft 2, the driven-side rotor 20 rotates along with the camshaft 2 while maintaining the relative rotational phase therebetween, and the driven-side rotor 20 performs relative rotation with respect to the driving-side rotor 10. Besides, in FIGS. 2 and 3, an arrow X shows an advance direction of the driven-side rotor 20 relative to the driving-side rotor 10, and an arrow Y shows a retard direction of the driven-side rotor 20 relative to the driving-side rotor 10.

Figure 3:
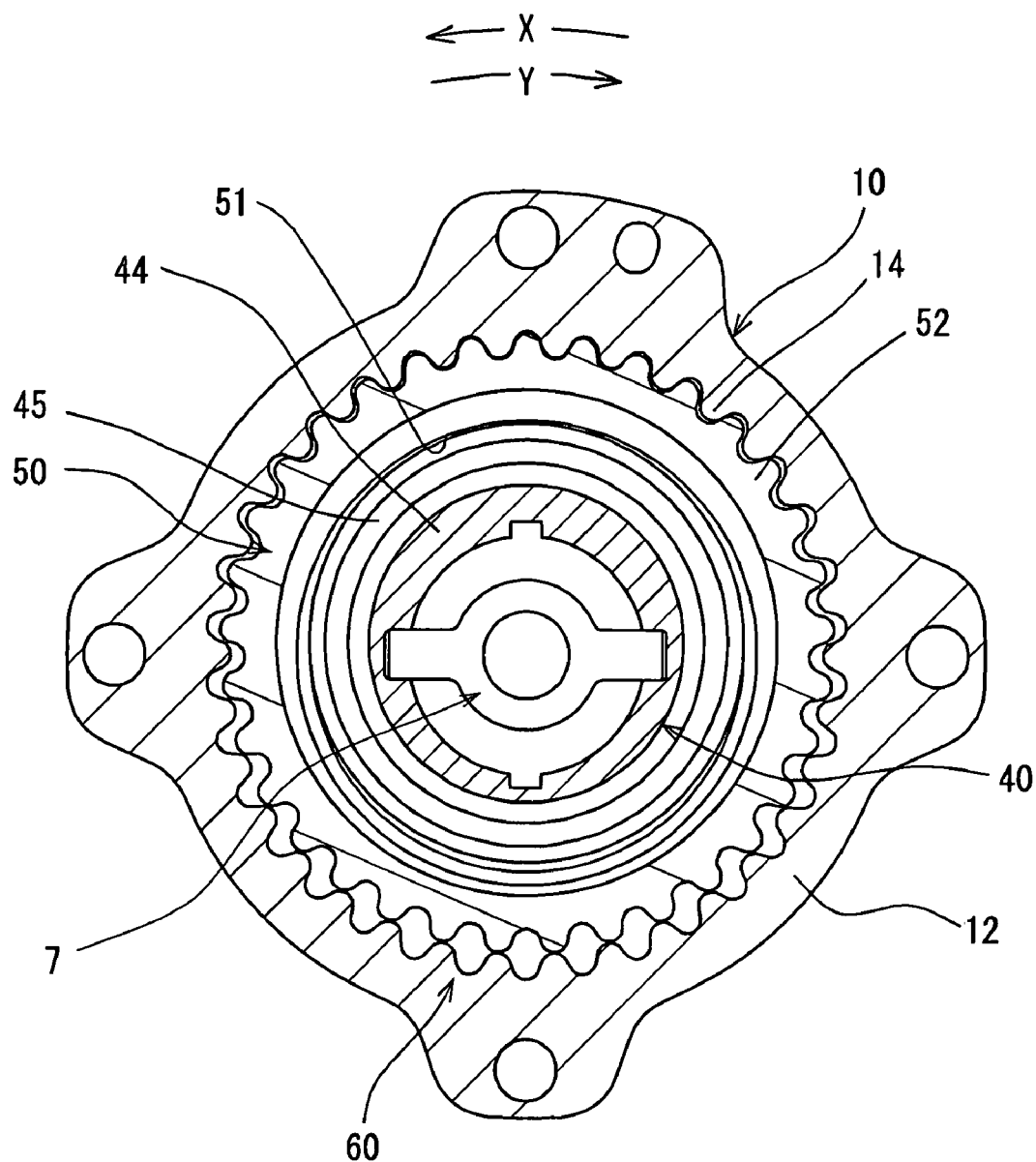
FIG. 3 is a cross sectional view taken along a line III-III in FIG. 1.

As shown in FIGS. 1 to 3, the planetary carrier 40 is formed cylindrical and forms an input wall 42 through which the controlling torque is inputted from the motor shaft 7. The motor shaft 7 is connected to the input wall 42 which is concentrical to the rotors 10 and 20. This connection allows the planetary carrier 40 to rotate along with the motor shaft 7, and to perform a relative rotation with respect to the rotors 10 and 20.

The planetary carrier 40 is provided with a support wall 44 which is eccentric relative to the rotors 10 and 20. That is, the support wall 44 and the input wall 42 are located in a line with the axial direction. The support wall 44 is engaged with an inner bore 51 of the planet gear 50 through a bearing 45. The planet gear 50 is supported by the support wall 44 so as to perform a planetary motion. The planet gear 50 rotates around a center of the support wall 44 and performs a planetary motion in a rotation direction of the support wall 44.

The planet gear 50 is formed in a cylindrical shape with a step, and is coaxially arranged to the support wall 44. That is, the planet gear 50 is always eccentrically arranged with respect to the rotors 10, 20. The planet gear 50 is provided with a driving-side external gear 52 and a driven-side external gear 54 on its large diameter portion and a small diameter portion. The gears 52, 54 respectively have the addendum circle outside of the dedendum circle. The driving side external-gear 52 is arranged in such a manner as to engage with the driving-side internal gear 14. The driven-side external gear 54 is arranged in such a manner as to engage with the driven-side internal gear 22.

The phase adjusting mechanism 8 is provided with a planetary mechanism 60 of the differential-gear type which reduces the rotation speed of the planet carrier 40 and transfer its rotational motion to the camshaft 2. And the phase adjusting mechanism 8 equipped with such a planetary mechanism 60 adjusts the engine phase according to the controlling torque inputted into the planet carrier 40 from the shaft body 7, so that the valve timing suitable for an internal combustion engine is realized.

When the control torque is held and the planet carrier 40 does not rotates relative to the driving-side rotor 10, the planet gear 50 rotates along with the rotors 10, 20 while maintaining an engagement position with the internal-gears 14 and 22. Therefore, an engine phase does not change and the valve timing is kept constant as the result.

When the control torque increases in the advance direction X and the planet carrier 40 performs relative rotating in the advance direction X relative to the driving-side rotor 10, the planet gear 50 performs the planetary motion so that the driven-side rotor 20 performs relative rotating in the advance direction X relative to the driving-side rotor 10. Therefore, an engine phase is advanced, and the valve timing is also advanced as the result.

When the control torque increases in the retard direction Y and the planet carrier 40 performs relative rotating in the retard direction X relative to the driving-side rotor 10, the planet gear 50 performs the planetary motion so that the driven-side rotor 20 performs relative rotating in the retard direction Y relative to the driving-side rotor 10. Therefore, an engine phase is retarded, and the valve timing is also retarded as the result.

Next, the characterizing portion of the first embodiment is explained in detail.

Figure 4:
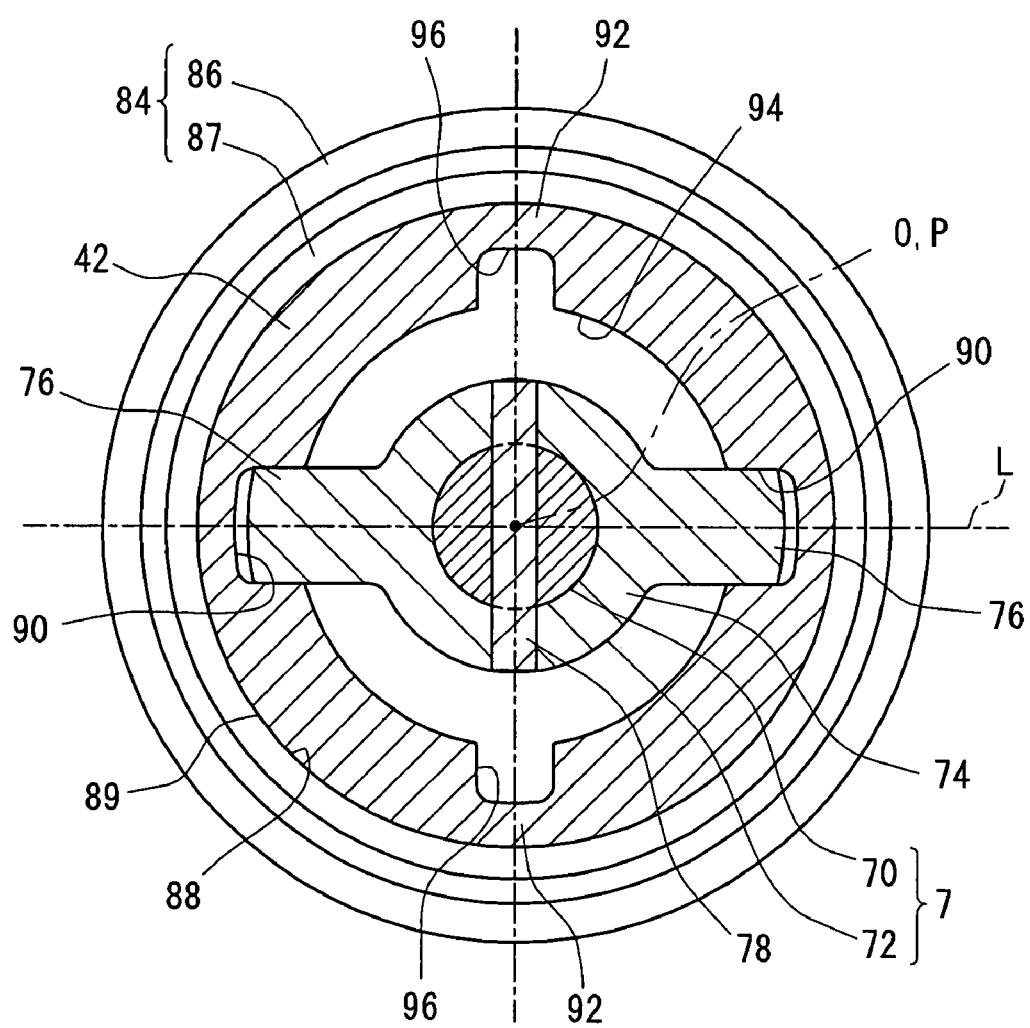
FIG. 4 is an enlarged sectional view showing a characterizing portion of the valve timing controller shown in FIG. 1.

As shown in FIG. 1, the motor shaft 7 includes a shaft member 70 and a joint member 72. The shaft member 70 is formed in the shape of a shaft, and rotates with the control torque which the electric motor 5 generates. The joint member 72 has an applied part 74 and a projected part 76. The applied part 74 is formed cylindrical and arranged concentrically at the inner circumference side of the cylindrical input wall 42 of the planet carrier 40. One end portion of the shaft member 70 is inserted in the inner circumference side of the applied part 74. As shown in FIGS. 1 and 4, the connecting pin 78 is inserted into the applied part 74 and the shaft member 70, whereby the joint member 72 can rotates with the shaft member 70. In the applied part 74, two projected parts 76 are provided in a radial direction across an axis line "O". Each projected part 76 of this embodiment is rectangular shape in the plane view of an axial direction.

As shown in FIG. 1, a fitting hole 82 is formed in a wall portion 80 of the gear member 12 concentrically with the rotors 10 and 20. In this embodiment, an outer race 86 of a radial ball bearing 84 is press-fitted into the inner circumference of the fitting hole 82. Thereby, the driving-side rotor 10 rotatably supports the planetary carrier 40 through the bearing 84. In the driven-side rotor 20, the driven-side internal gear 22 is positioned apart from the bearing 84 rather than the driving-side internal gear 14.

As shown in FIGS. 1 and 4, the input wall 42 is concentrically press-fitted into the inner circumference of the inner race 87 of the bearing 84, and an inner surface 88 of the inner race 87 and an outer surface 89 of the input wall 42 are in tight contact with each other in a circumferential direction. In the input wall 42, the fitting recesses 90 are respectively formed in two places which counter in the radial direction (horizontal direction of FIG. 4) on both sides of an axis line "P". Each fitting recess 90 is provided to the inner circumference of the input wall 42, and is rectangular groove which extends along an axial direction of the planetary carrier 40. Each fitting recess 90 is respectively engaged with corresponding projected part 76 of the joint member 72.

Figure 5:
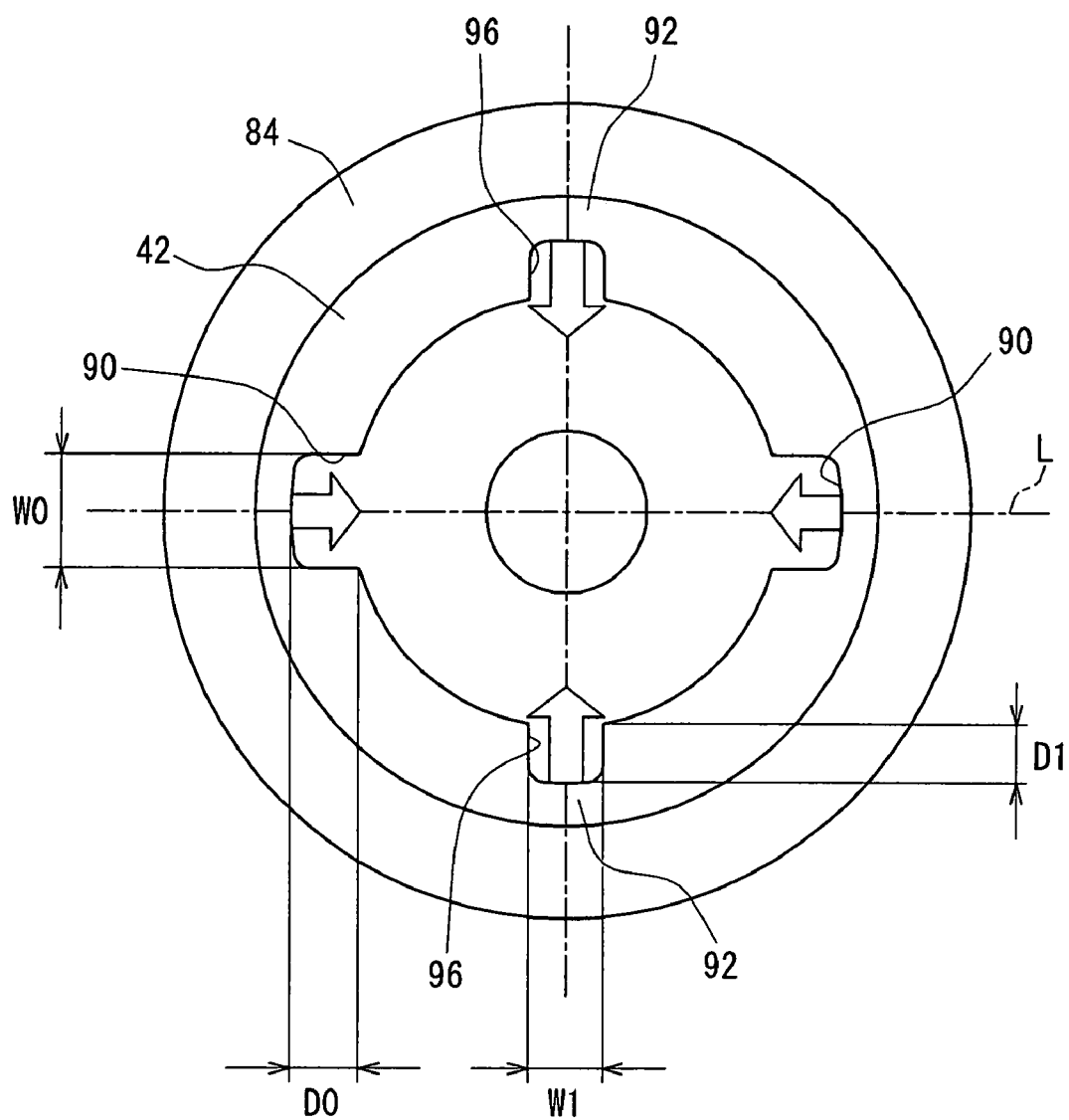
FIG. 5 is a schematic diagram for explaining the characteristic of the valve timing controller shown in FIG. 1.

Furthermore, in the input wall 42, the thin-wall portion 92 is provided at two places which sandwiches the axis line P in a direction (vertical direction of FIG. 4) which is perpendicular to a line connecting the fitting recesses 90. That is, as shown in FIG. 4, each thin-wall portion 92 is symmetrically provided with respect to a line "L" on which each fitting recess 90 confronts each other. Each thin-wall portion 92 makes the input wall 42 thinner in the radial direction rather than both-side portions of each fitting recess 90. The inner concave portions 96 are provided at the inner surface 94 of the input wall 42. The bottom surfaces of the inner concave portions 96 forms the thin-wall portions 92. Besides, as shown in FIGS. 1 and 4, each inner concave portion 96 is the rectangular groove which extends along the axial direction of the planetary carrier 40. As shown in FIG. 5, width W1 and depth D1 of the inner concave portion 96 are established smaller than width W0 and depth D0 of the fitting recess 90, respectively.

When the input wall 42 is press-fitted into the inner circumference of the bearing 84, the input wall 42 tends to deform symmetrically at the both sides of the axis "L". Comparing with the case of FIG. 6 without a thin-wall portion 92, in the input wall 42 which has the thin-wall portion 92, the rigid difference produced between portions becomes small to the same extent on both sides of the axis "L". Therefore, in the input wall 42 of this embodiment, it is difficult to produce the deformation difference in the circumferential direction by press-fitting the bearing.

Figure 6:
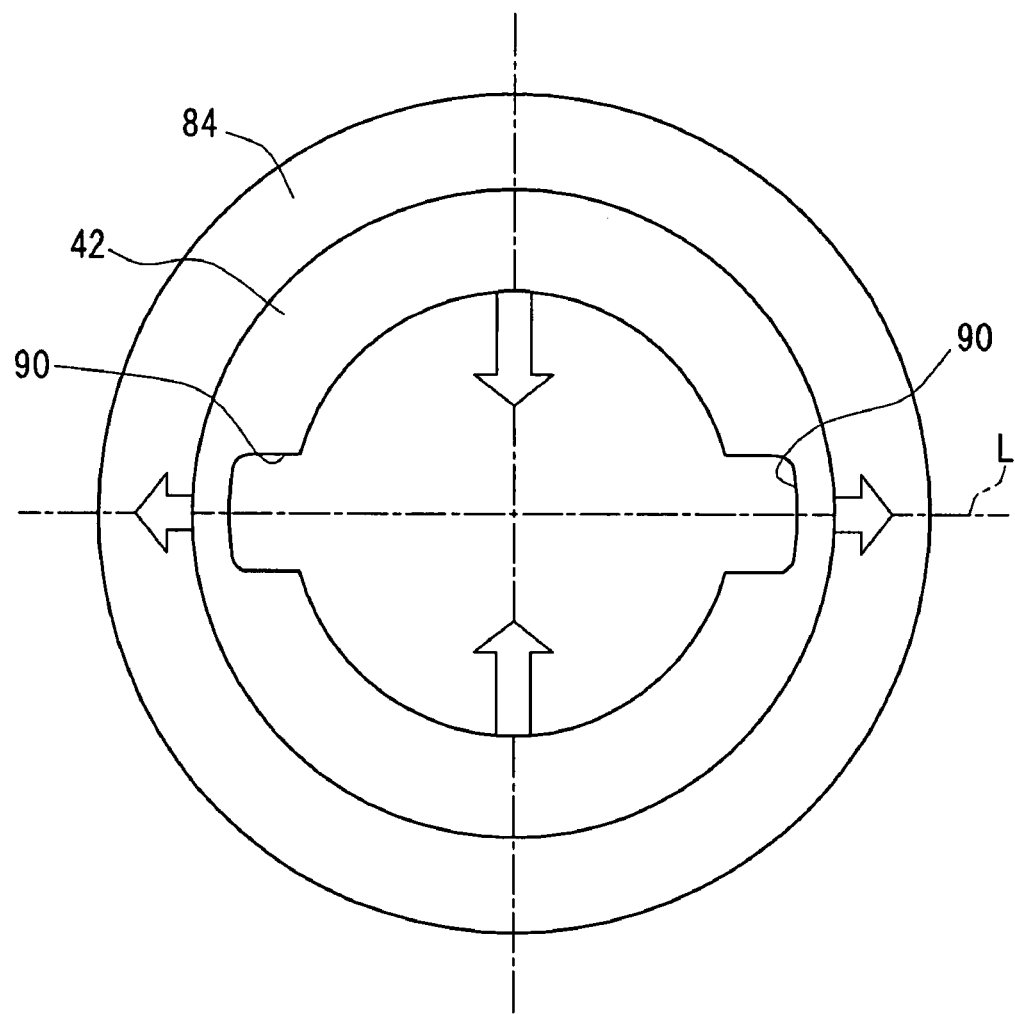
FIG. 6 is a schematic diagram for explaining the characteristic of a comparative example.

Specifically, in a case that no thin-wall portion is provided as shown in FIG. 6, the input-wall 42 deforms outwardly at a vicinity of the fitting recess 90. And at intermediate portions between two fitting recesses 90, the input-wall 42 deforms inwardly. Hence, a large difference in deformation arises between these portions, and there is a possibility that the input wall 42 may become an ellipse form. On the other hand, in the case of this embodiment with the thin-wall portion 92 shown in FIG. 5, the input wall 42 deforms inwardly at the vicinity of the fitting recesses 90. And deformation amount of the input wall 42 at the intermediate portions are restricted. Hence, the difference in deformation becomes small.

According to the first embodiment, since the fitting recess 90 is hardly deformed even if the input wall 42 is press-inserted, the fitting recess 90 and the projected part 76 are easily assembled. During its operation, an anti-wear quality between the fitting recess 90 and the projected part 76 is enhanced. Moreover, even if deformation of the input wall 42 is transferred to the inner surface 88 (refer to FIG. 4) of the inner race 87 of a bearing 84 due to press-insert, the roundness of the inner surface 88 is hardly affected.

Furthermore, in the first embodiment, since each inner concave portion 96 is arranged at rotation symmetry place of the fitting recess 90 with respect to the axis line P, it may be happened that the projected part 76 is erroneously inserted to the inner concave portions 96. However, since the width W1 and the depth D1 of each inner concave portion 96 are established smaller than each fitting recess 90, a projected part 76 cannot be erroneously fitted into these concave portions 96. Therefore, it is prevented that the projected part 76 is erroneously inserted into the inner concave portion 96.

Furthermore, according to the first embodiment, the bearing 84 and the driven-side internal gear 22 are arranged apart from each other in the axial direction. Therefore, when the large bending moment resulting from the radial road from the gear part 22 to the planet gear 50 acts on a bearing 84, there is a possibility that the lifetime of bearing 84 may fall. However, in a bearing 84, since deterioration of roundness is restrained, lowering of a lifetime can be stopped at minimum value.

In addition, the bearing 84 can reduce the supporting backlash, since the planet carrier 40 is press-inserted into the inner race 87 and the outer race 86 is press-fitted to the driving-side rotor 10.

Second Embodiment

Figure 7:
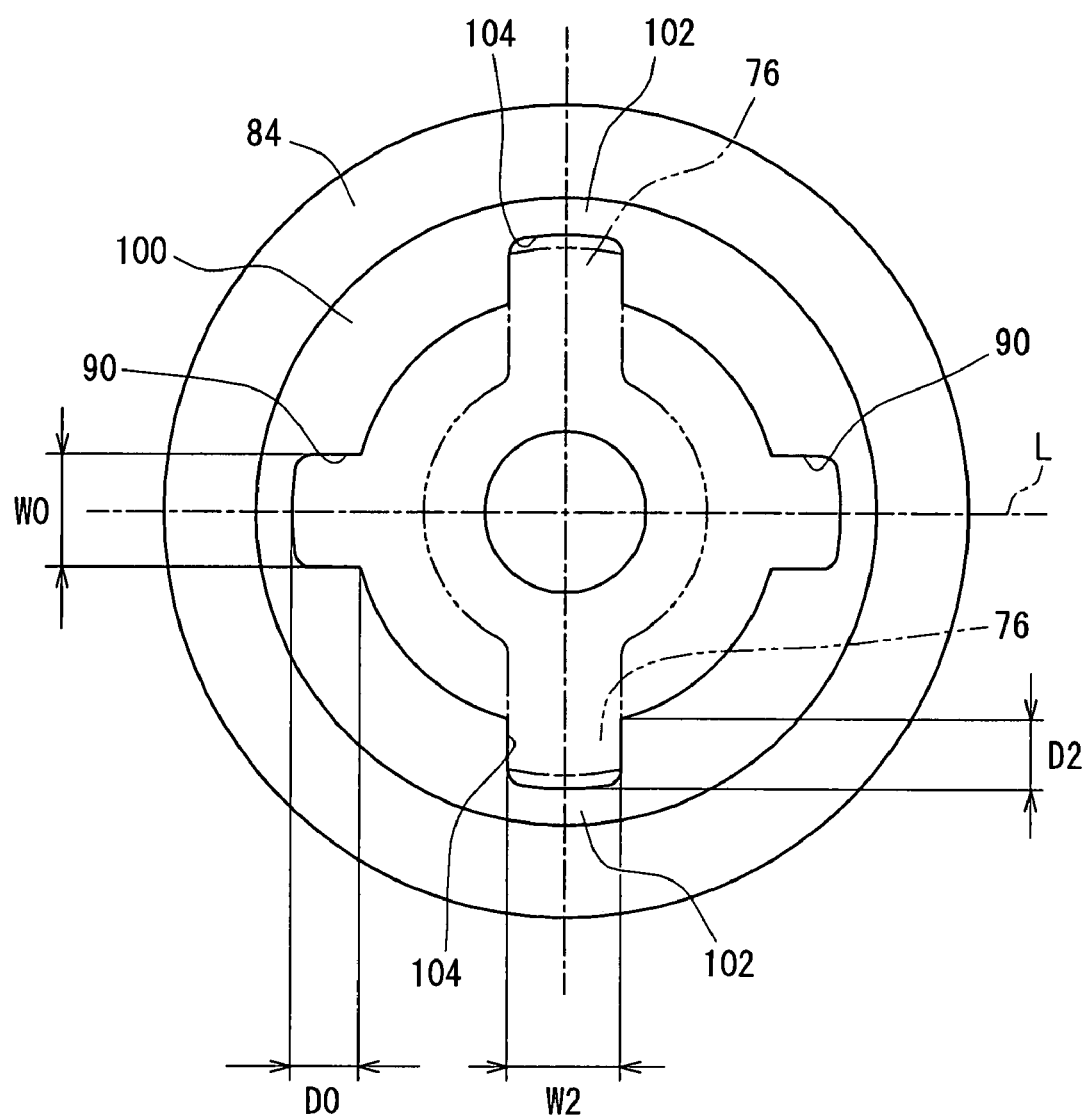
FIG. 7 is a schematic diagram showing a characterizing portion of the valve timing controller according to a second embodiment.

As shown in FIG. 7, in the input wall 100 of a second embodiment, the width W2 and the depth D2 of the inner concave portion 104 which form each thin-wall portion 102 are substantially equal to the width W0 and the depth D0 of the fitting recess 90, respectively. Therefore, as shown by two-dot chain line in FIG. 7, even if each projected part 76 is erroneously inserted into the inner concave portion 104, these concave portions 104 can be operated as the fitting recess 90.

Third Embodiment

Figure 8:
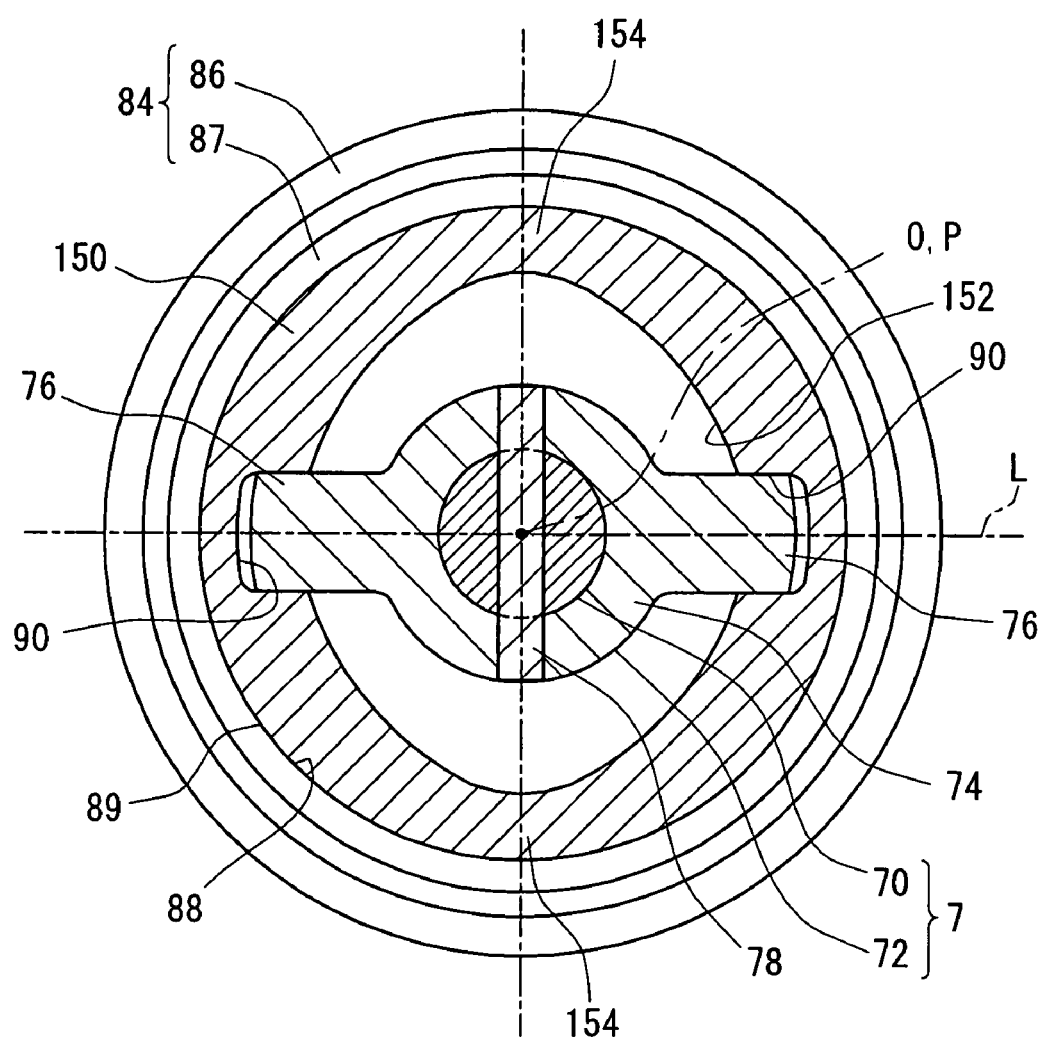
FIG. 8 is a cross sectional view showing a valve timing controller according to a third embodiment.

As shown in FIG. 8, in a third embodiment of this invention, each thin-wall part 154 is formed by denting and curving the inner surface 152 of the input wall 150 outwardly in a radial direction. Therefore, the projected part 76 is prevented from erroneously being inserted into a portion other than fitting recess 90 of the input wall 150.

Fourth Embodiment

Figure 9:
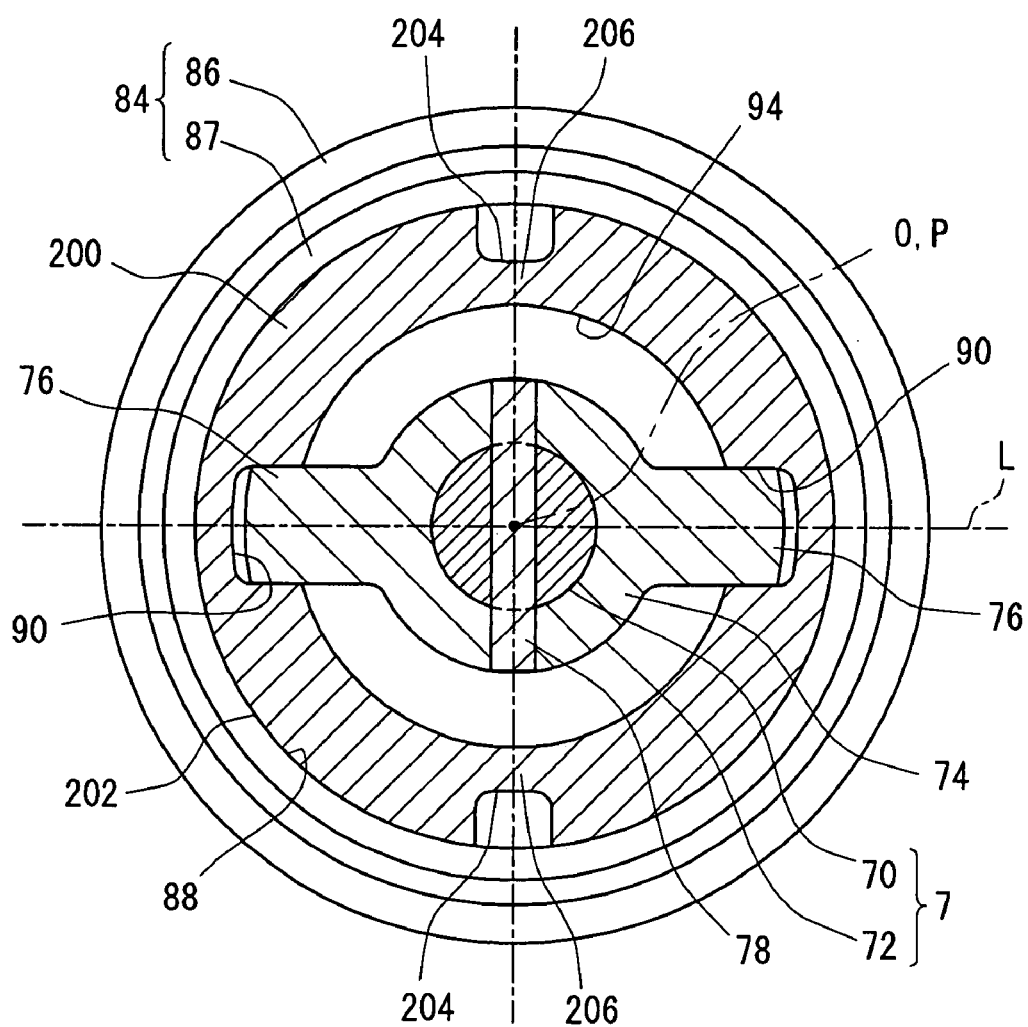
FIG. 9 is a cross sectional view showing a valve timing controller according to a fourth embodiment.

As shown in FIG. 9, in the input wall 200 of a fourth embodiment, two outer concave portions 204 are provided on an outer surface 202 of the input wall 200, so that thin-wall portions 206 are formed. Any shape of the outer concave portions 204 can be acceptable to avoid an erroneous insertion of the projected part 76.

Fifth Embodiments

Figure 10:
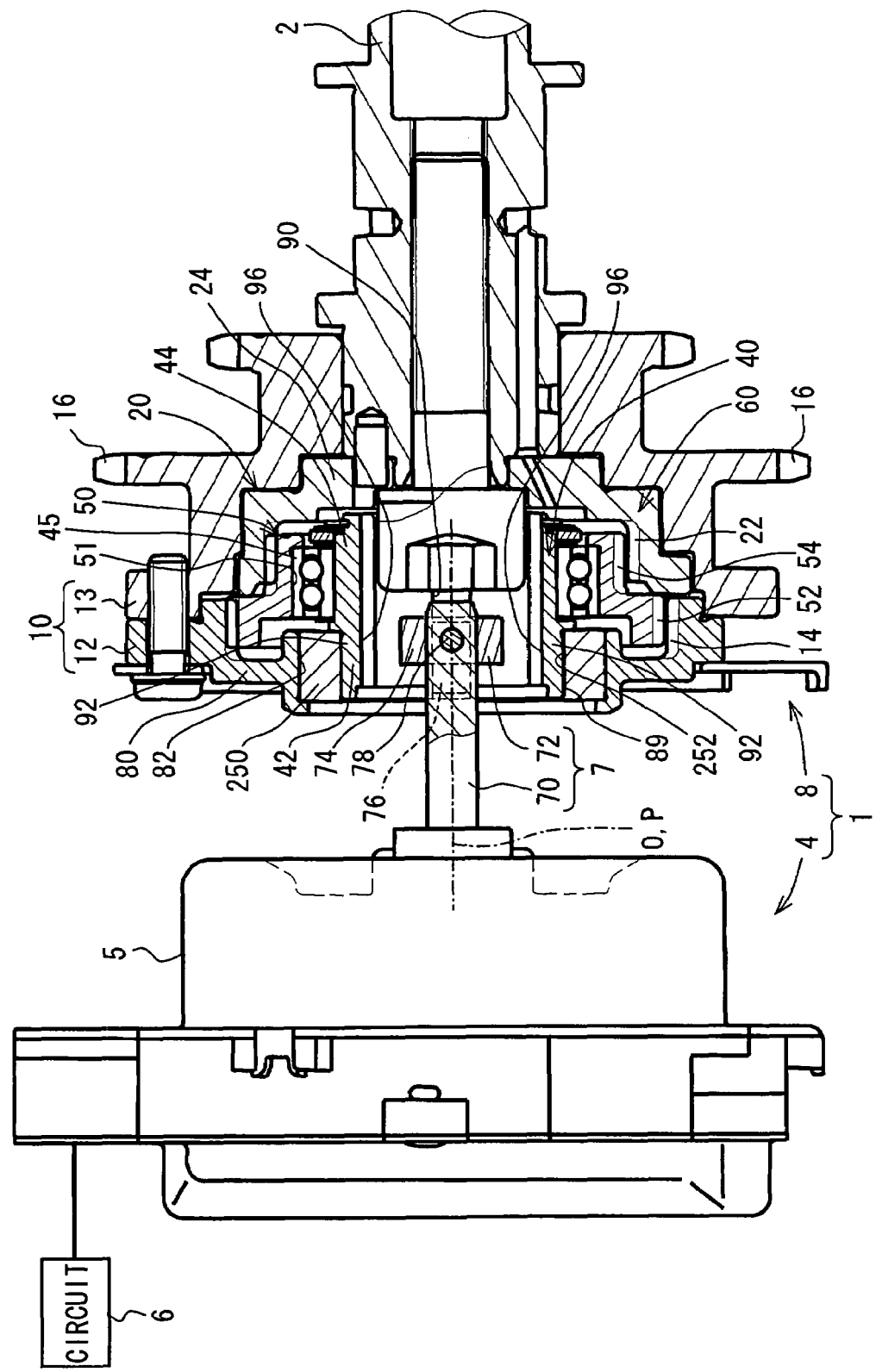
FIG. 10 is a cross sectional view showing a valve timing controller according to a fifth embodiment.

As shown in FIG. 10, in a fifth embodiment, a slide-bearing 250 is used instead of the ball-bearing 84 of the first embodiment. This sliding bearing 250 is made of metal bushes, and is rotatably inserted into the inner circumference of the fitting hole 82 of the gear member 12. Moreover, the input wall 42 of the planet carrier 40 is concentrically press-fitted into the inner circumference of the slide-bearing 250, and the inner surface 252 of the bearing 250 is in contact with the outer surface 89 of the input wall 42. Thereby, the driving-side rotor 10 rotatably supports the planet carrier 40 through the bearing 250. The fitting recess 90 is hardly deformed.

Sixth Embodiment

Figure 11:
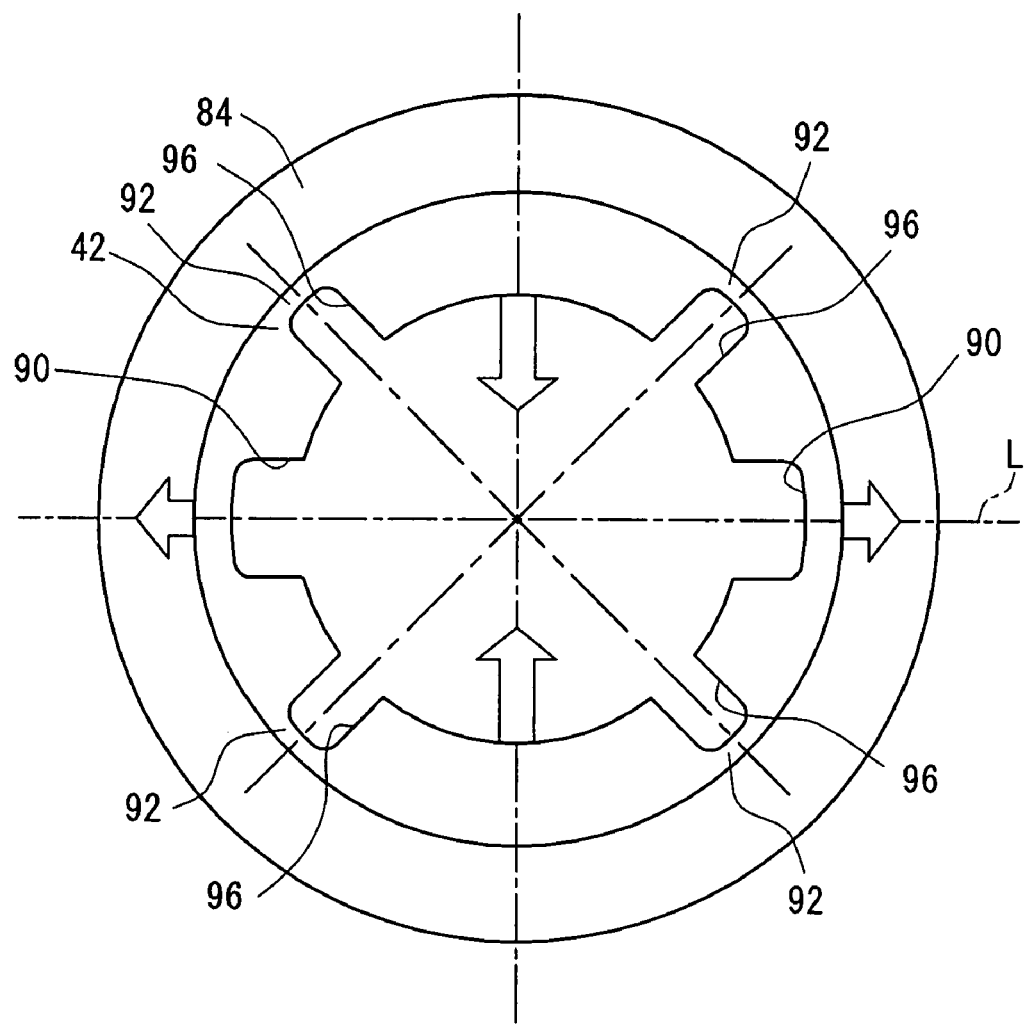
FIG. 11 is a schematic diagram showing a characterizing portion of the valve timing controller according to a sixth embodiment.

As shown in FIG. 11, in the sixth embodiment, four inner concave portions 96 are formed in axial symmetry with respect to the axis line "L" of the fitting recess 90. Namely, four thin-wall portions 92 are provided in the circumferential direction.

Other Embodiments

The present invention is not limited to the embodiment mentioned above, and can be applied to various embodiments.

For example, a suitable number of thin-wall portion 92, 102, 154, 206 can be provided to the input wall 42, 100, 150, 200 at places which are not symmetric with respect to the line "L". In this case, the thin-wall portion 92, 102, 154, 206 may be provided at a place which is symmetric with respect to the line "L", alternatively, the thin-wall portion 92, 102, 154, 206 may be provided at a place which is symmetric with respect to the line "L". Three or more fitting recesses 90 may be provided in the input wall 42, 100, 150, 200, and three or more projected part 76 may be provided correspondingly. And, a suitable number of thin-wall 92, 102, 154, 206 may be provided in the input wall 42.

Only one of the width W1 and depth D1 of the inner concave portion 96 can be set smaller than that of the fitting recess 90.

As long as supporting of a radial road is possible, a radial roller bearing can be adopt instead of the radial ball bearing. Moreover, as long as supporting of a radial road is possible, the slide-bearing 250 may be a spherical slide-bearing instead of the metal bush.

As a torque generating system 4, a dynamo-electric brakes and hydraulic motors, such as an electromagnetic brake or a fluid brake, can be employed.

The rotor 10 may perform the interlocking rotation with the camshaft 2, and the rotor 20 may perform the interlocking rotation with the crankshaft. The phase adjusting mechanism 8 may be a structure in which the planet gear is engaged with the gear provided in one of the rotors.

At least one of the gears 14 and 22 and corresponding gears 52, 54 may be changed into the external gear and the internal gear, respectively.

And the present invention is applicable also to the apparatus which adjusts the valve timing of the exhaust valve, and the apparatus which adjusts the valve timing of the intake valve and the exhaust valve.

What is claimed is:

1. A valve timing controller adjusting a valve timing of an intake valve and/or an exhaust valve of an internal combustion engine, comprising:
    a torque generation means including an output rotor for generating a control torque which is outputted from the output rotor;
    a phase adjusting mechanism including an input rotor connected with the output rotor, and adjusting a relative rotational phase between a crankshaft and a camshaft of the internal combustion engine according to the control torque which is inputted into the input rotor from the output rotor; and
    a bearing member for rotatably supporting the input rotor; wherein
    the input rotor forms a cylindrical input wall press-inserted into an inner circumference of the bearing member,
    the input wall is provided with a fitting recess on its inner surface for engaging with the output rotor, the input wall is provided with a thin-wall portion of which thickness is reduced in a radial direction, and the fitting recess and the thin-wall portion are circumferentially arranged apart from each other.

2. A valve timing controller according to claim 1, wherein the output rotor is structured by combining a shaft member which is rotated by the control torque and a joint member which is provided for the shaft member for engaging with the fitting recess.

3. A valve timing controller according to claim 1, wherein the bearing member is a ball-bearing.

4. A valve timing controller according to claim 1, wherein the bearing member is a slide-bearing.

5. A valve timing controller according to claim 1, wherein the thin-wall portion is formed by denting the inner surface of the input wall radially outwardly.

6. A valve timing controller according to claim 1, wherein the thin-wall portion is formed by denting an outer surface of the input wall radially inwardly.

7. A valve timing controller according to claim 1, wherein two fitting recesses are respectively provided at two places which radially confront across a center axis of the input wall, and two thin-wall portions are respectively provided at two places in such a manner that a connecting line between two fitting recesses are orthogonal to another connecting line between two thin-walls.

8. A valve timing controller according to claim 7, wherein the thin-wall portion is formed by an inner concave portion which opens at inner surface of the input wall, and at least one of a circumferential width and a radial depth of the inner concave portion is smaller than that of the fitting recess.

9. A valve timing controller according to claim 7, wherein the thin-wall portion is formed by an inner concave portion which opens at inner surface of the input wall, and a circumferential width and a radial depth of the inner concave portion are substantially equal to that of the fitting recess.

10. A valve timing controller according to claim 1, wherein the phase adjusting mechanism includes:
    a first rotor having a first gear, being engaged with an outer surface of the bearing member, and rotating along with one of the crankshaft and the camshaft;
    a second rotor having a second gear apart from the first gear in an axial direction, and rotating along with the other of the crankshaft and the camshaft;
    a planet gear performing a planet motion to vary the relative rotational phase while engaging with the first gear and the second gear; and
    a planetary carrier as the input rotor forming a supporting wall which supports the planet gear from its inner surface in such a manner as to perform the planet motion, the supporting wall being deviate from the input wall in the axial direction.

11. A valve timing controller according to claim 1, wherein two fitting recesses are respectively provided at two places which radially confront across a center axis of the input wall, and a plurality of thin-wall portions are symmetrically provided with respect to a line connecting two fitting recesses.

* * * * *